J. A. NORTON.
IRRIGATING MACHINE.
APPLICATION FILED JULY 17, 1915.

1,255,777.

Patented Feb. 5, 1918.
5 SHEETS—SHEET 2.

Witnesses
Otto E. Hoddick.
Albert O'Brien

Inventor
James A. Norton.
By A. J. O'Brien,
Attorneys

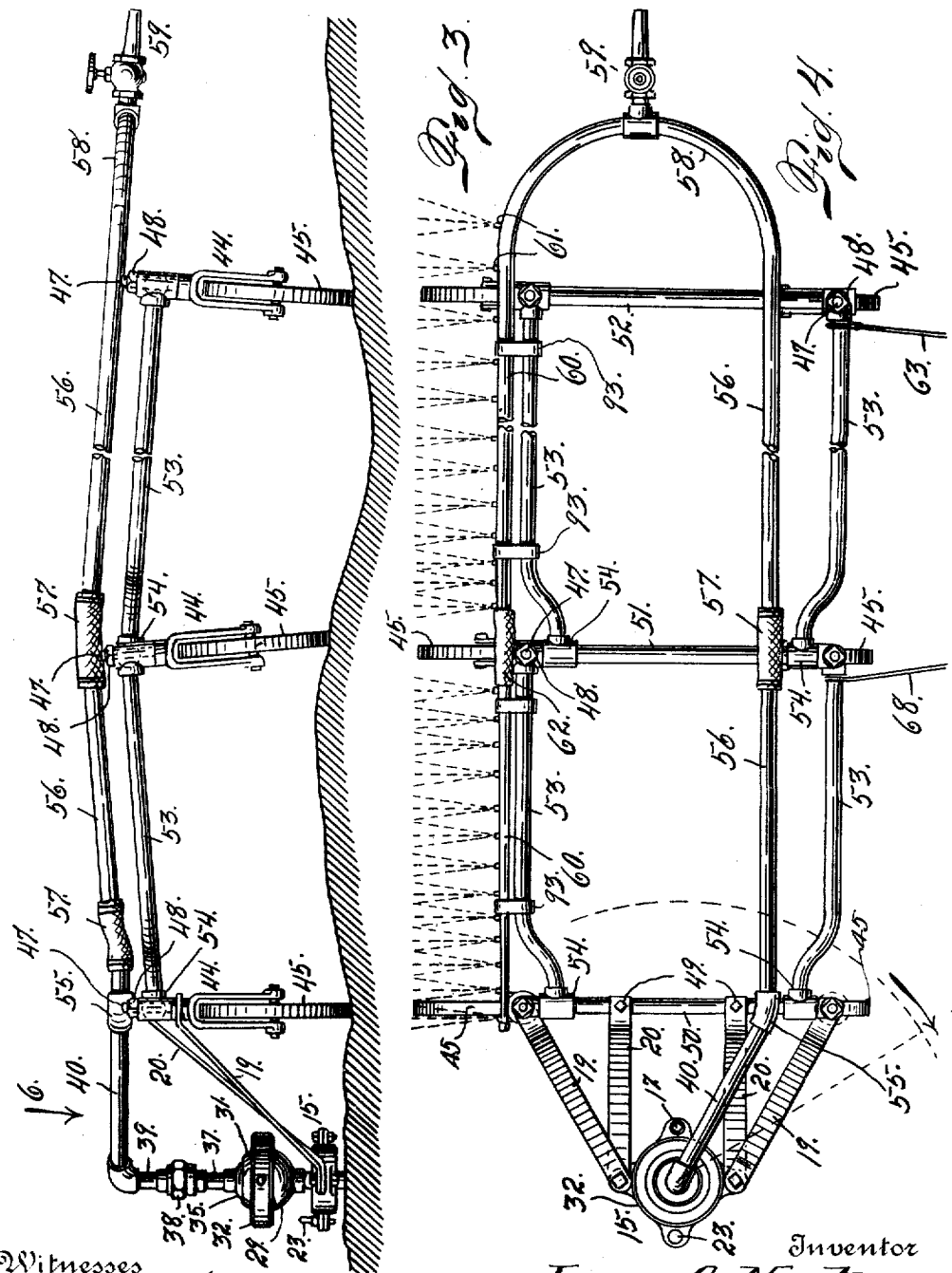

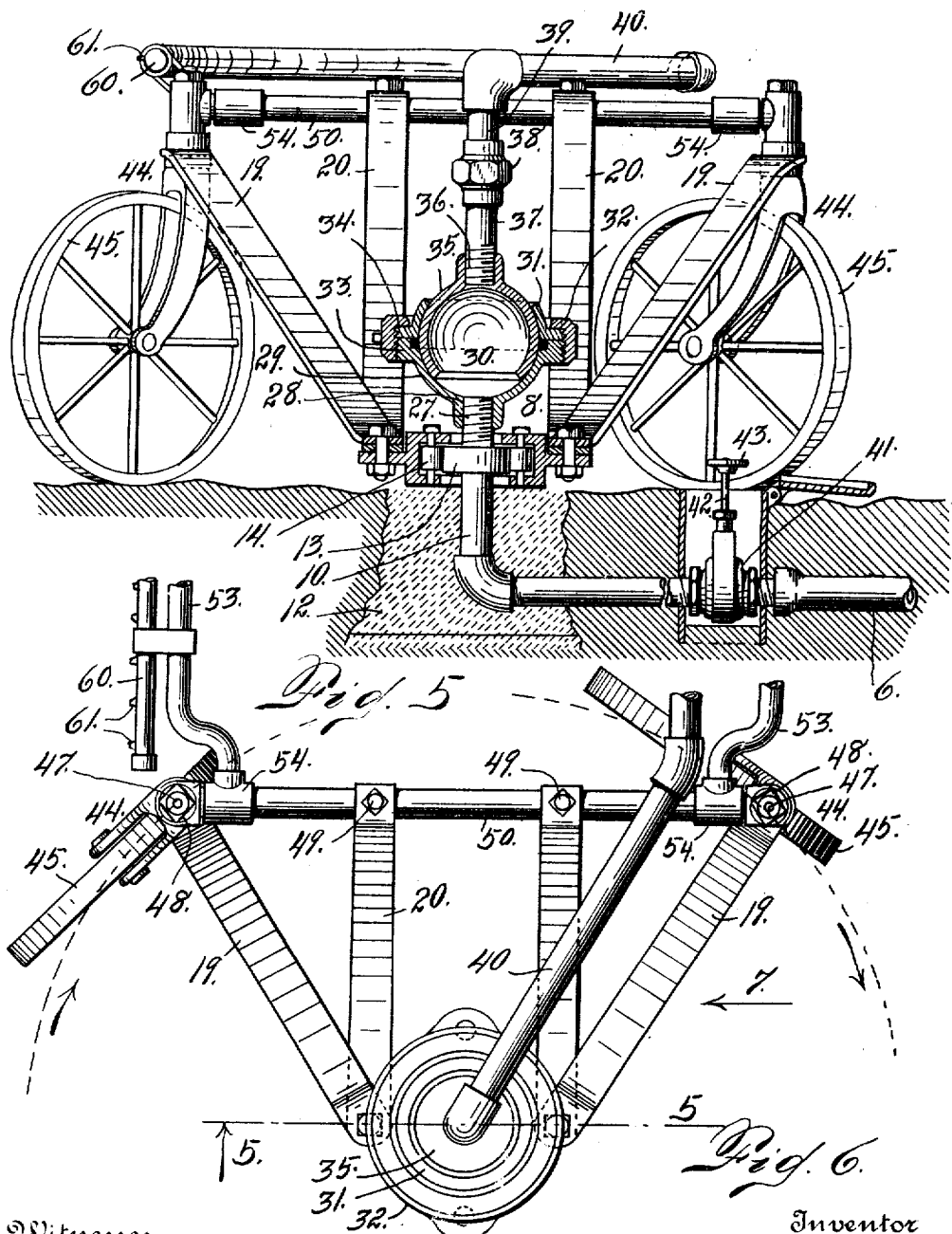

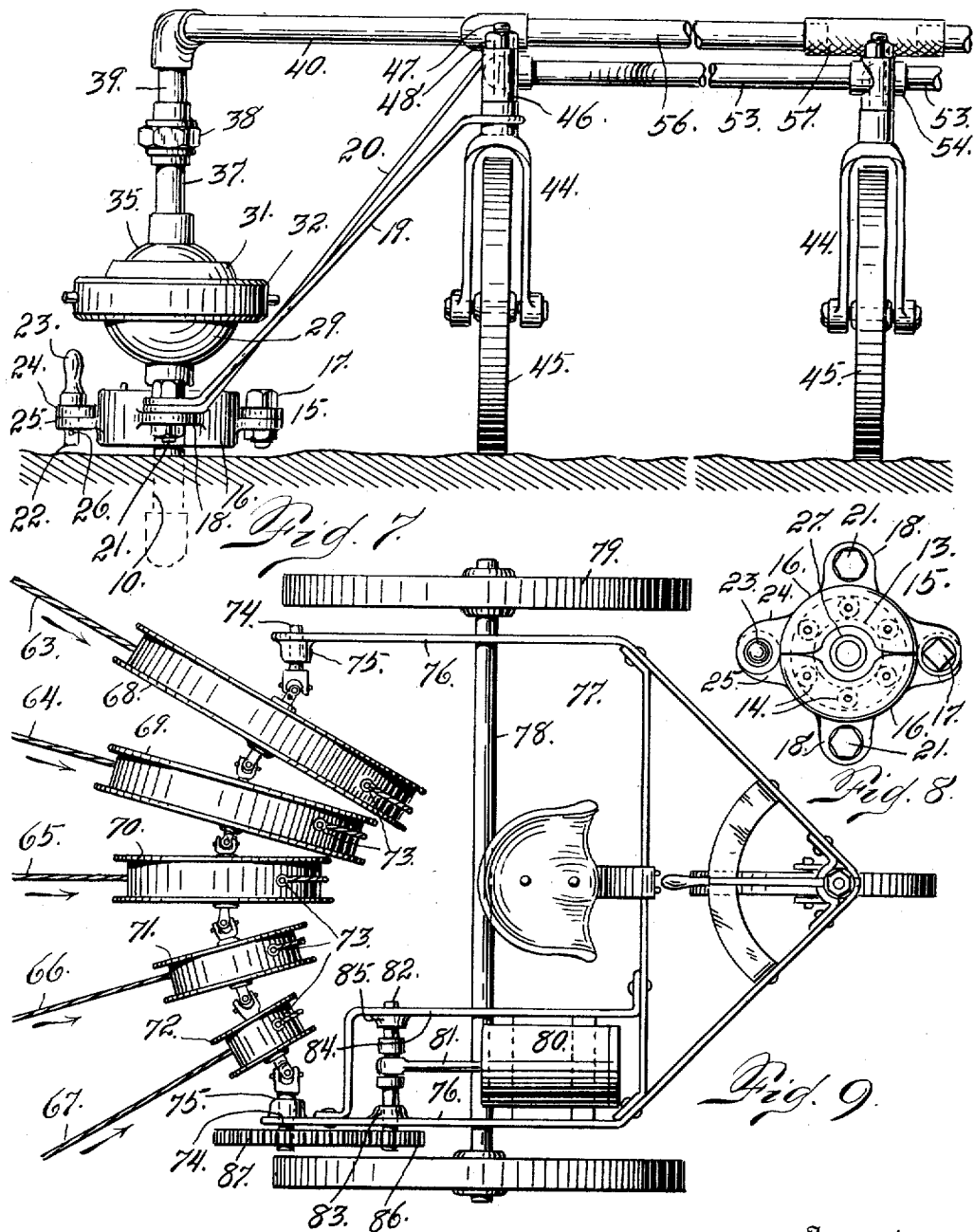

UNITED STATES PATENT OFFICE.

JAMES A. NORTON, OF ODEBOLT, IOWA, ASSIGNOR, BY DIRECT AND MESNE ASSIGNMENTS, TO GOLDEN WEST PUMP COMPANY, OF SIOUX FALLS, SOUTH DAKOTA, A CORPORATION OF SOUTH DAKOTA.

IRRIGATING-MACHINE.

1,255,777.  Specification of Letters Patent.  Patented Feb. 5, 1918.

Application filed July 17, 1915. Serial No. 40,419.

*To all whom it may concern:*

Be it known that I, JAMES A. NORTON, a citizen of the United States, residing at Odebolt, county of Sac, and State of Iowa, have invented certain new and useful Improvements in Irrigating-Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in apparatus for irrigating land and includes a pump, a centrally located water supply under pressure, and a machine for distributing the water. The topography of the ground is immaterial to the working of the machine, as it operates with equal advantage over all kinds of uneven ground as well as on smooth or level land.

In the operation of the water-distributing machine, one extremity of the latter is coupled to the hydrant at the center of a ten acre square of the ground to be irrigated. This machine consists of an arrangement of pipes mounted upon a flexible frame which in turn is supported by a number of caster wheels. The water-distributing portion of the machine consists of two main pipes, one of which is directly connected with the hydrant and rearwardly located with reference to the travel of the machine, while the other is forwardly located, the two pipe members being connected by a bend, whereby the rear pipe may be said to merge into the forwardly located pipe, which is perforated for the discharge of water and diminishes in size from the outer extremity of the machine toward the inner extremity or toward the hydrant, in order that the water discharged from the machine may be in proportion to the area of the ground over which the particular nozzles travel. In other words, the farther the discharge nozzles are located from the center of the field, the greater the quantity of water discharged. The cross sectional area of the discharge pipe member is varied in order to accurately accomplish the aforesaid result.

The frame which carries the water-discharging conduits, is made in sections, mounted upon the caster wheels and about five feet from the ground, so that crops, such as tall corn, or grape vines and blackberries may be irrigated. With each frame section is connected a small cable, and these cables are alternately wound up and paid out from a series of drums carried by a flexible shaft mounted upon an engine which is carried by a vehicle, the latter being anchored during the operating travel of the irrigating machine. It is preferred to anchor the machine in four different positions equidistantly arranged around the ten-acre square, for instance, to be irrigated. For example, the machine is actuated through the instrumentality of the engine, from one position sufficiently to irrigate or pass over one-fourth of the ten-acre lot. The machine is then stopped and the engine changes its position, and so on, until the machine, which is pivoted to the central hydrant, is caused to travel entirely around the square to be irrigated. The different positions of the operating engine are required in order that the power may be advantageously applied to the radially disposed machine.

It will be understood that in irrigating a square field of the character indicated, the corners normally would not be touched, that is, there will be certain corner-areas beyond the circle of the normal outer extremity of the machine.

In order to irrigate these corners, the outer extremity of the framework of the machine is equipped with a hose which is in communication with the water conduit, and a man uses a nozzle connected with the hose in irrigating these corner-areas. As the machine moves very slowly, it is practicable to properly irrigate such areas while the outer extremity of the machine is traveling from its tangential position at the center of one side of the field, to a corresponding position on the adjacent side.

Having briefly outlined my improved construction, I will proceed to describe the same in detail, reference being made to the accompanying drawing in which is illustrated an embodiment thereof. In this drawing,—

Fig. 3 is a rear view of the machine, partly broken away, and shown on a larger scale.

Fig. 4 is a top plan view of the same, or a view looking in the direction of arrow 6, Fig. 3, shown on the same scale.

Fig. 5 is a section taken on the line 5—5, Fig. 6, viewed in the direction of the arrow, the parts being shown on a still larger scale.

Fig. 6 is a top plan view of the hydrant and the adjacent extremity of the machine, the balance of which is broken away. This is a view looking in the direction of arrow 6, Fig. 3, but on a much larger scale.

Fig. 7 is a view looking in the direction of arrow 7, Fig. 6.

Fig. 8 is a top plan view in detail of the coupling for connecting the irrigating machine with the hydrant.

Fig. 9 is a top plan view of the engine for operating the machine.

The same reference characters indicate the same parts in all the views.

Figure 1:
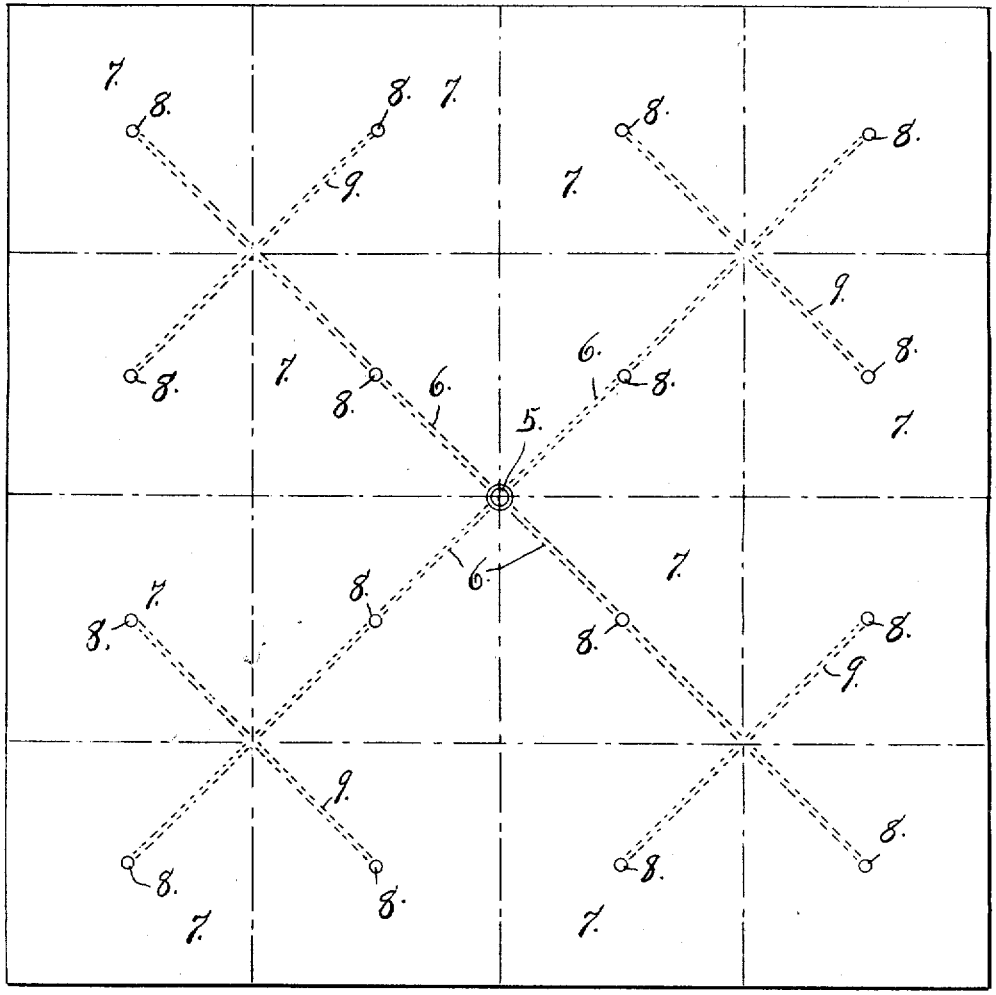
Figure 1 is a diagrammatic view illustrating a one-hundred and sixty acre field divided into squares, showing a centrally located water supply and a series of hydrants in the respective squares, with which the irrigating machine may be connected.

Referring to Fig. 1, the numeral 5 designates the source of water supply for a relatively large field, say, one-hundred and sixty acres. This may represent a well equipped with a pump, and a storage tank into which the water may be pumped and thence distributed to pipes 6 which radiate from the source of supply and extend diagonally from the center of the field toward its corners. These main conduits 6 are located below the surface of the ground a sufficient distance not to interfere with tillage. At the center of each ten-acre square 7 is located a hydrant 8, which is in communication with the main source of supply 5. As shown in the drawing, each of the main pipes 6 is directly in communication with one hydrant 8. These pipes 6 are each intersected by a relatively short pipe or conduit 9, which extends at right angles to the corresponding main pipe or conduit, and is equipped with a hydrant 8 at each extremity, the hydrants in all cases being located at the center of the square to be irrigated, which, as illustrated in the drawing, is assumed to be an area of ten acres. This hydrant structure is illustrated in Figs. 3 to 7, inclusive, of the drawing, and consists of a vertically disposed pipe member 10 extending upwardly from the extremity of a pipe 6 or 9, as the case may be. I will assume that the hydrant shown in the drawing is one of the terminal hydrants of a pipe 6, referring to Fig. 1 of the drawing. This terminal pipe member 10 is embedded in a quantity of concrete 12, and its upper extremity where it projects above the ground is equipped with a cylindrical bearing member 13, which is engaged by a number of antifrictional rollers 14 carried by a coupling 15, which consists of two members 16, comprising a casing which opens on a pivot or hinge bolt 17. The two parts of this casing are provided with oppositely located lugs 18 to which are secured inclined frame bars 19 and 20 on opposite sides, which bars form a part of the hydrant extremity of the irrigating apparatus. These frame bars are secured to the lugs 18 by bolts 21, which are passed through registering openings formed in the extremities of the frame bars 19 and 20 of the said lugs. Opposite the hinge bolt 17, the casing members are connected by a removable pin 22, which, for convenience, is provided with a handle 23. This pin passes through overlapping lugs 24 and 25 with which the members 16 of the coupling are provided. After insertion, the pin 22 may be held in place by a key or cotter 26, or other suitable means, adapted to prevent the accidental removal of the pin when the apparatus is not in use. The upright member 10 of the hydrant is provided above the coupling 15, with a threaded extension 27 which is connected as shown at 28, with the lower part 29 of a partially spherical socket 30. The upper member 31 of this socket is connected with the lower member by a coupling sleeve 32, which is interiorly threaded to engage exterior threads formed on the adjacent flanges 33 and 34 of the two socket members. The member 29 of this socket is semispherical in shape, while the member 31 extends above the semispherical member, thus forming the socket portion of a ball and socket joint, the ball member 35 being secured as shown at 36, to the lower extremity of a pipe member 37 which is connected by means of a coupling member 38 with a depending vertically disposed portion 39 of the main conduit 40 of the irrigating apparatus.

When it is desired to disconnect the apparatus from the hydrant, the pin 22 is removed from the coupling 15, and one of the bolts 21 also taken out, whereby the frame bars 19 and 20 on one side of the coupling will be disconnected. This will permit the opening of the coupling, whereby the irrigating apparatus may be disconnected from one hydrant preparatory to its connection with another hydrant. Furthermore, in disconnecting the irrigating apparatus from the hydrant, it will be necessary to operate the coupling sleeve 39 sufficiently to disconnect the pipe member 37 from the depending conduit member 39 of the main conduit 40 of the irrigating apparatus. Close to the hydrant, the ground conduit 6 is provided with a valve 41, whose stem 42 is equipped with an exposed hand-wheel 43, whereby the water may be turned on and off at will.

The two frame bars 19 of the irrigating apparatus, diverge outwardly from the hydrant as they extend upwardly, their upper extremities being perforated to receive the stems 47 of the forks 44 of the caster wheels 45. These stems project through perforations formed in the upper extremities of these frame bars and through sleeves 46, the upper extremities of the stems being threaded to receive fastening nuts 48. The frame bars 20 are upwardly inclined from the hydrant coupling, their upper extremities being secured by means of bolts 49, with a transversely arranged member 50 of the upper framework of the irrigating apparatus. This upper framework, in addition to the transverse member 50, is provided with a number of other transverse members 51 and 52. The adjacent transverse members of this upper framework of the irrigating apparatus are connected by spaced longitudinally disposed frame members 53, whose opposite extremities have swiveled connections 54 with the transverse members, whereby this upper framework is flexible and adapted to yield to conform to the varying surface of the field over which the machine is traveling. In other words, the surface may be uneven or rolling (see Fig. 3), without in any way interfering with the proper operation of the apparatus. This, of course, is due to the flexibility of the upper framework of the structure. This framework is supported upon a number of pairs of caster wheels 45, each having a fork 44 and a stem 47. All of the caster wheels are substantially of the same structure as the pair nearest the hydrant, and which has heretofore been described when explaining the connection of the frame bars 19 with the upper framework of the structure. It is evident that the irrigating apparatus must be of considerable length in order to extend from the centrally located hydrant to the outside of a ten-acre field to be irrigated at one operation. Under the circumstances, it is practically necessary that the machine should be half the length of the ten-acre field, or three hundred and thirty feet in length. In Figs. 3 and 4 of the drawing, the structure is shown broken away both as to the upper framework and the conduit structure, in order to indicate that it may be formed of any desired length. It will be understood that the length may be indefinite, as long as the sections of the upper framework composed of the transverse members 53, are sufficiently short to give the entire structure the desired flexibility, in order to enable the apparatus to conform to the unevenness or rolling condition of the ground to be irrigated. It should be understood that while the apparatus is of considerable length as just explained, it will be comparatively narrow. The caster wheels 45 are arranged in pairs, the individual members of each pair being arranged one in front of the other, there being two of these caster wheels for each transverse member 50, 51 and 52 of the structure.

The main conduit member 40, after leaving the hydrant, extends laterally to a point 55 directly above the adjacent transverse member 50, where it merges into the first section 56 of the long forwardly located, longitudinally disposed pipe or conduit, which extends the entire length of the apparatus and is composed of a series of these sections 56, which are joined at their adjacent extremities by flexible couplings 57, thus making this part of the conduit structure flexible in order to conform to the flexible condition of the upper framework which forms the support for the water-conducting structure. The sections 56 of the conduit are of the same length, approximately, as the distance between the adjacent transverse members 50, 51 and 52. The outermost section 56 of the forward portion of the conduit structure, merges into a bend 58 which is supplied with a nozzle 59. This bend 58 extends rearwardly from the inner extremity of the outermost section 56 of the conduit and merges into the first section 60 of the rearwardly located portion of the conduit, which is provided with nozzles 61 for discharging the water for irrigating purposes. The outermost section 60 of this rearwardly located member is largest, or of greatest cross sectional area. In fact, this rearwardly located water-discharge member tapers from its outer extremity inwardly, toward the hydrant, whereby the water discharge is greatest at the outer extremity of this member, and proportionately diminishes toward the inner extremity, or center of the section to be irrigated. Each of these sections may be designated by the numeral 60, the said sections being connected by flexible joints 62 which provide the necessary yielding capacity to correspond with the varying conditions of the ground, as heretofore explained when describing the forwardly located conduit member composed of the sections 56. It should also be explained that the nozzles 61 are largest at the outer extremity of the rearwardly located discharge-conduit, and gradually diminish in size toward the inner extremity of the machine, whereby the discharge capacity is made to correspond with the cross sectional area of the portions of the discharge conduit upon which they are mounted.

In order to operate the irrigating apparatus or machine, a number of cables 63, 64, 65, 66 and 67 are respectively connected with the forward frame members 53 of the structure at one extremity and extend to a series of drums 68, 69, 70, 71 and 72, and are made fast thereto as shown at 73, (see Fig. 9). These drums diminish in size in the order named, that is to say, the drum 68 whose cable 63 extends to the outer extremity of the irrigating apparatus, is largest, while the other drums which are connected with the shorter cables 64, 65, 66 and 67, respectively, diminish in size to correspond with the shortening of their respective cables and also to correspond to the diminishing circumference of the travel of the extremities of these cables which are connected with the irrigating apparatus.

These drums are mounted on journals which are connected to constitute a flexible shaft whose extremities are journaled, as shown at 74, in bearings 75 mounted on the rear extremities of frame bars 76 constituting a part of the body of a vehicle 77, having an axle 78 mounted on the ground wheels 79. Upon this vehicle is mounted an engine including a cylinder 80, and a piston therein whose stem 81 is connected with the crank shaft 82 journaled in one of the frame bars 76, as shown at 83, and in an auxiliary bar 84, as shown at 85. Upon one extremity of this crank shaft is made fast a gear 86 which meshes with a larger gear 87 fast on one of the journals 74 of the flexible shaft carrying the series of drums 68 to 72, inclusive.

Figure 2:
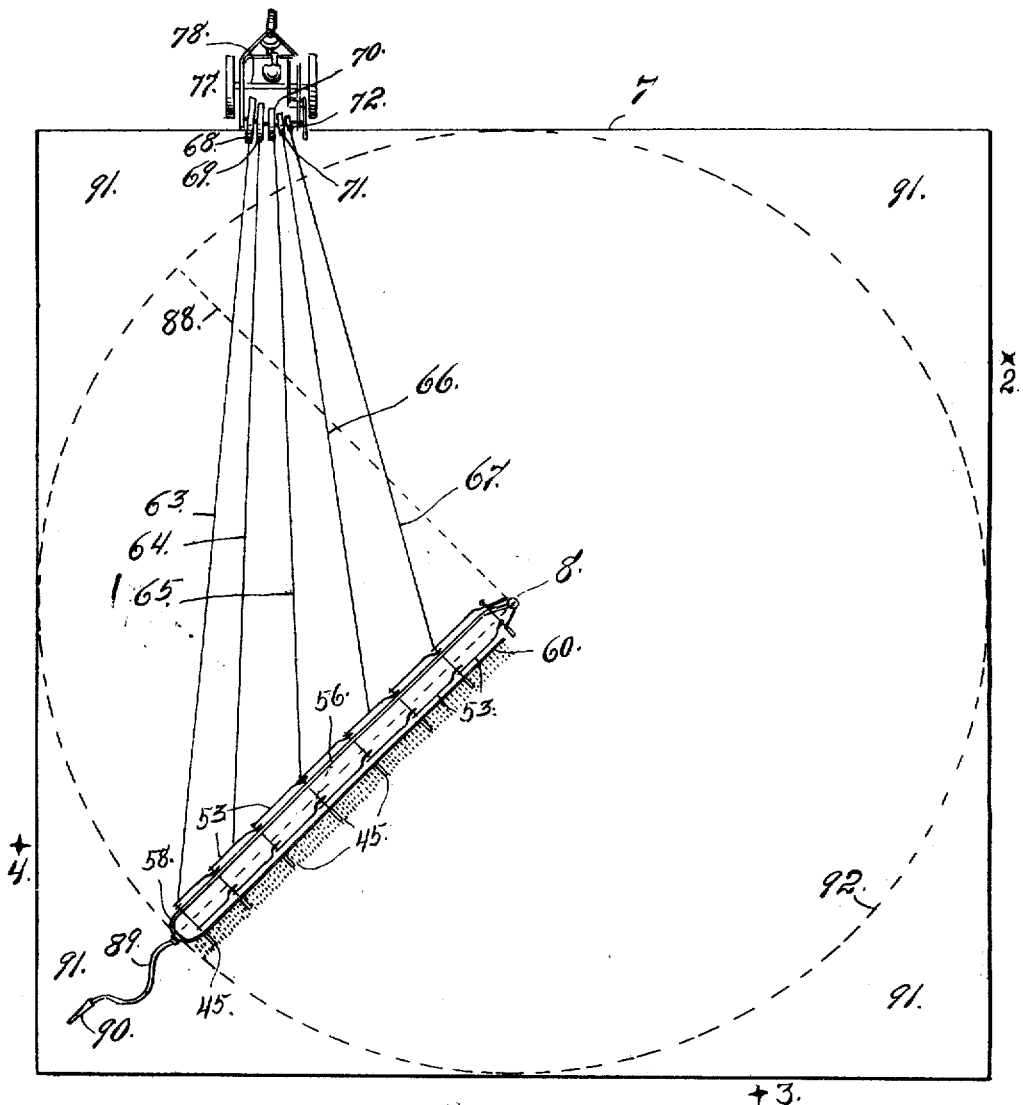
Fig. 2 is a view showing one of these squares on a larger scale and illustrating the machine in operation, the machine and the operating engine being shown in top plan view.

When the irrigating apparatus is in operation, assuming that it is mounted as indicated in Fig. 2, and as heretofore described in detail, being rotatably connected with a hydrant 8, in the center of the square area to be irrigated, and assuming that the cables 63 to 67, inclusive, are respectively connected with the drums 68 to 72, inclusive, and also assuming that the engine or operating apparatus carrying the drums is located as shown in Fig. 2 of the drawing, the operation of the engine will rotate the flexible shaft and impart a corresponding movement to the drums thereon, whereby the pull upon the several cables connected with the irrigating machine will be properly applied to cause the same to move from the position shown in Fig. 2, to the position indicated by the dotted line 88, or one-quarter the distance around the field. By the time the irrigating machine reaches the dotted line 88, it will be advisable to change the position of the engine 77 from the position shown in Fig. 1, to approximately the position indicated by the numeral 2 in Fig. 2. During the movement of the engine from one position to the other, the cables 63 to 67, inclusive, which have been wound upon the drums during the movement of the irrigating apparatus over the first quarter of the area of the field, will be paid out from the cables so that they will be virtually unwound or in the condition shown in Fig. 2, by the time the engine reaches the second position, after which the engine will be started and the operation continued until the irrigating apparatus has passed over another quarter of the field, making in all, one-half thereof. In this event, the position of the operating engine is changed to that indicated approximately by the numeral 3 in Fig. 2, when the operation is repeated, after which the irrigating apparatus will have been passed over three-fourths of the field; then, by changing the position of the engine to that indicated by the numeral 4 in Fig. 2, the irrigating machine may be returned to the original position, the whole field having been irrigated.

During the operation of the machine, the services of a man will be required for the purpose of irrigating the corners by the use of a flexible hose 89, provided with a nozzle 90, the hose being in communication with the water conduit on the apparatus, at the outer extremity of the latter. This nozzle will be manipulated by the person in charge, for the purpose of properly sprinkling or supplying water to the corners, indicated by the numeral 91, and beyond the dotted circle 92 (see Fig. 2), which indicates the path of the outer extremity of the irrigating apparatus during its operation, as heretofore described.

In order to securely connect the rearwardly located water-distributing member of the conduit to the framework of the machine, each section 60 of this conduit member is connected with a frame bar 53 of the adjacent section of the frame, by means of securing bands 93 which are passed around the frame members 53 and the sections 60 of the water-distributing conduit member, whereby the said member is rigidly held in place upon the frame.

Attention is called to the fact that the swiveled connections between the extremities of the longitudinally disposed frame bar sections 53 of the transverse members 50, 51 and 52, is effected by the employment of sleeves which are rigidly secured to the members 53 and move freely rotatably upon the corresponding transverse members 50, 51 and 52.

Having thus described my invention, what I claim is:—

1. Irrigating apparatus comprising a wheeled frame rotatably connected with the hydrant, the frame comprising a series of transversely arranged and longitudinally disposed bars, the extremities of the longitudinal bars being hingedly connected with the adjacent transverse bars, and a conduit mounted on the said frame and rigidly connected therewith, the said conduit comprising a forwardly-located non-perforated longitudinally disposed member, extending from the hydrant to the outer extremity of the apparatus and merging into a rearwardly located water-distributing member extending toward the hydrant.

2. Irrigating apparatus comprising a wheeled frame rotatably connected with the hydrant, the frame comprising a series of transversely arranged and longitudinally disposed bars, the extremities of the longitudinal bars being hingedly connected with the adjacent transverse bars, and a conduit mounted on said frame and rigidly connected therewith, the said conduit comprising a forwardly-located non-perforated longitudinally disposed member, extending from the hydrant to the outer extremity of the apparatus, and merging into a rearwardly located water-distributing member extending toward the hydrant, and diminishing in cross sectional area from its outer extremity toward the hydrant.

3. Irrigating apparatus comprising a hydrant, a relatively long radially disposed water-distributing apparatus comprising a number of jointed frame sections and a corresponding number of jointed water distributing conduit sections, the framework being mounted on wheels, cables connected with the different sections of the frame, drums varying in size and with which the cables are respectively connected at their extremities remote from the water-distributing apparatus, and means for rotating the drums whereby the water-distributing structure is caused to travel around the hydrant for irrigating purposes.

In testimony whereof I affix my signature in presence of two witnesses.

JAMES A. NORTON.

Witnesses:
 BESS MITCHELL,
 A. EBERT O'BRIEN.

Copies of this patent may be obtained for five cents each, by addressing the "Commissioner of Patents, Washington, D. C."